United States Patent
Rohrs

[11] Patent Number: 6,099,025
[45] Date of Patent: Aug. 8, 2000

[54] ADJUSTABLE WHEELBARROW SYSTEM

[76] Inventor: Donald Paul Rohrs, 62536 State Rd. 19, Elkhart, Ind. 46517

[21] Appl. No.: 09/195,957

[22] Filed: Nov. 19, 1998

[51] Int. Cl.[7] .................................................. B62B 1/00
[52] U.S. Cl. .................. 280/659; 280/47.17; 280/47.31; 280/47.315; 280/47.32; 298/3
[58] Field of Search ..................................... 280/653, 651, 280/655, 655.1, 659, 652, 47.17, 47.24, 47.26, 47.3, 47.31, 47.315, 47.32; 298/2, 3

[56] References Cited

U.S. PATENT DOCUMENTS

| | | | |
|---|---|---|---|
| 1,255,128 | 2/1918 | Bayley | 280/47.31 |
| 1,506,030 | 8/1924 | Smith | 280/47.31 |
| 2,824,748 | 2/1958 | Schoenberger | 280/653 |
| 4,767,128 | 8/1988 | Terhume | 280/47.31 X |
| 5,087,061 | 2/1992 | Wallace | 280/653 X |
| 5,149,116 | 9/1992 | Donze et al. | 280/47.26 |

Primary Examiner—Brian L. Johnson
Assistant Examiner—Bryan Fischmann

[57] ABSTRACT

An adjustable wheelbarrow is provided including a basin, a wheel support assembly including at least one bar mounted on the basin and having a wheel rotatably mounted thereon, and a stand assembly including at least one foot depending from the basin. Next provided is a handle assembly including a pair of handle bars each with a first end pivotally mounted with respect to the basin and an adjustment mechanism including an adjustment plate fixedly coupled to the stand assembly. The adjustment mechanism further includes a locking arm with a T-shaped configuration including a horizontal rod rotatably mounted between the handle bars and a vertical rod having a first end fixedly coupled to the horizontal rod and a second end being adjustably engageable with the locking plate. As such, the handle bars of the handle assembly may be selectively angled with respect to the basin. As an option, a length of the handle bars may also be adjusted.

6 Claims, 3 Drawing Sheets

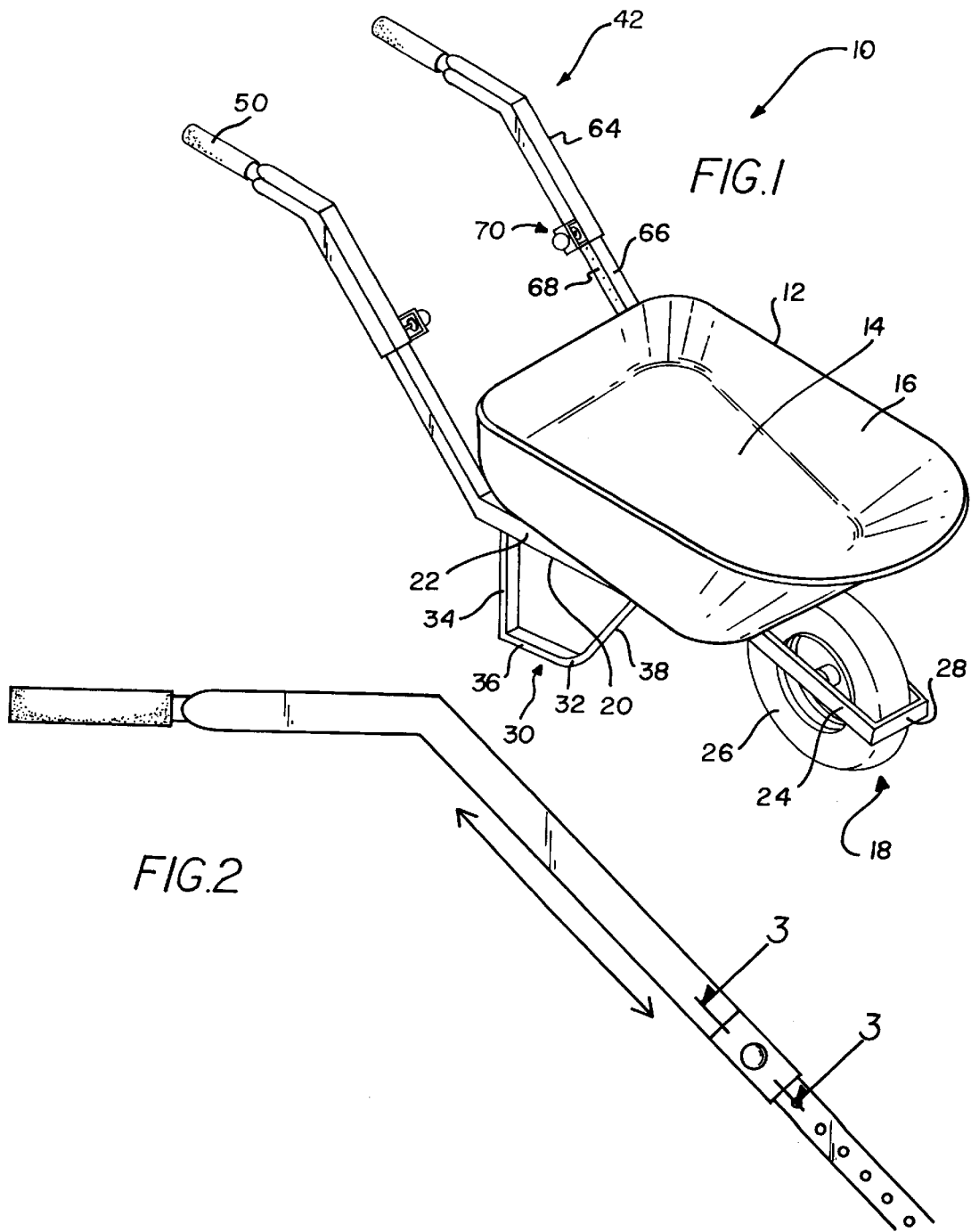

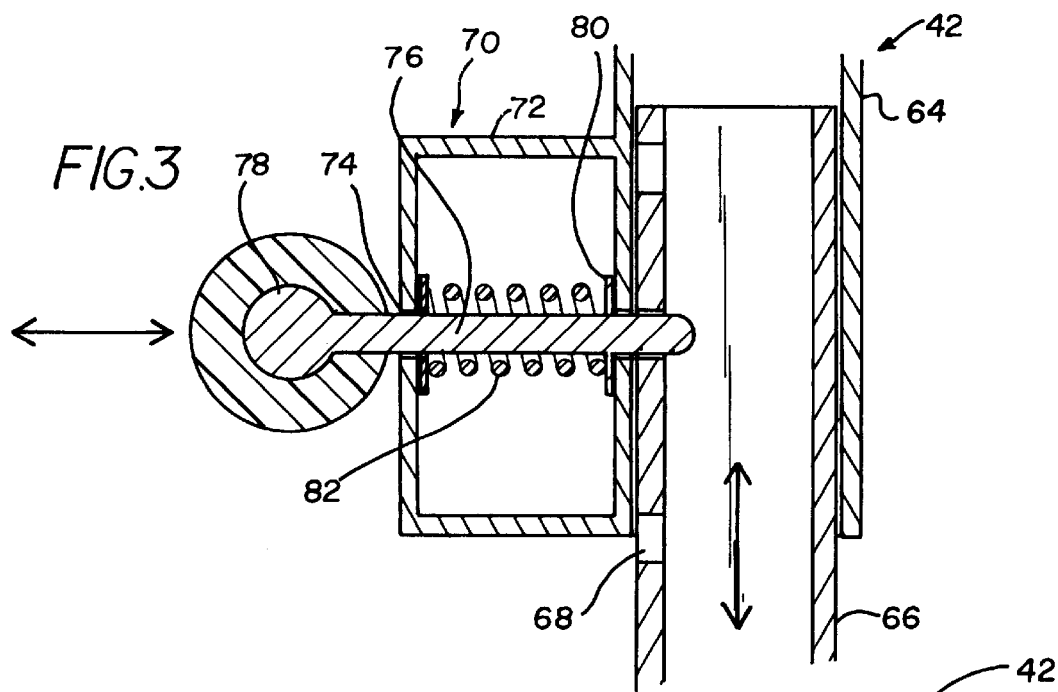
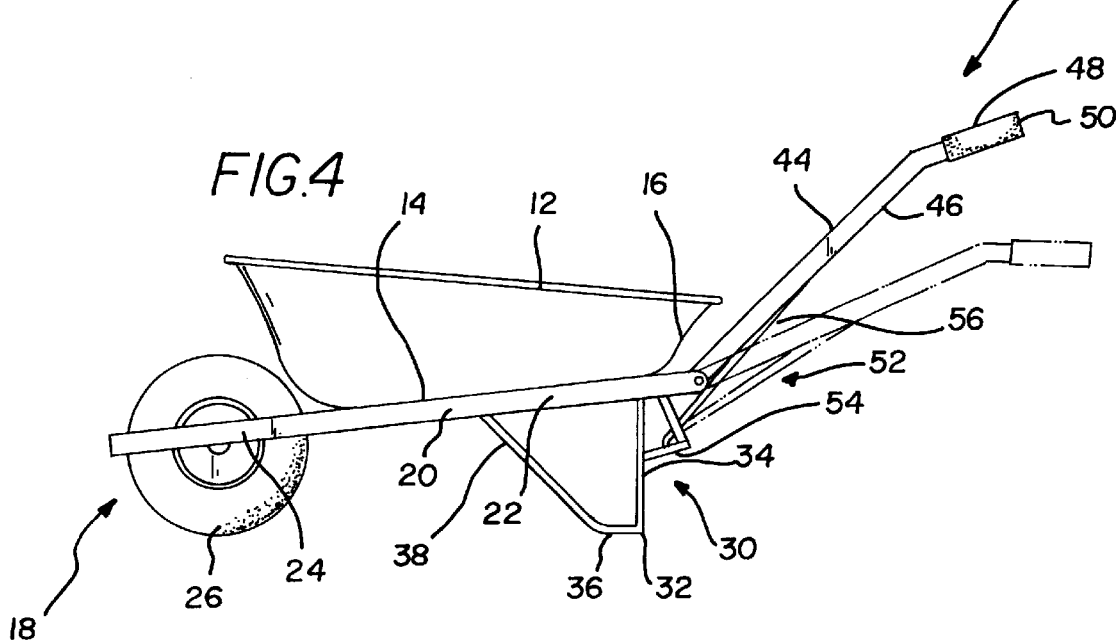

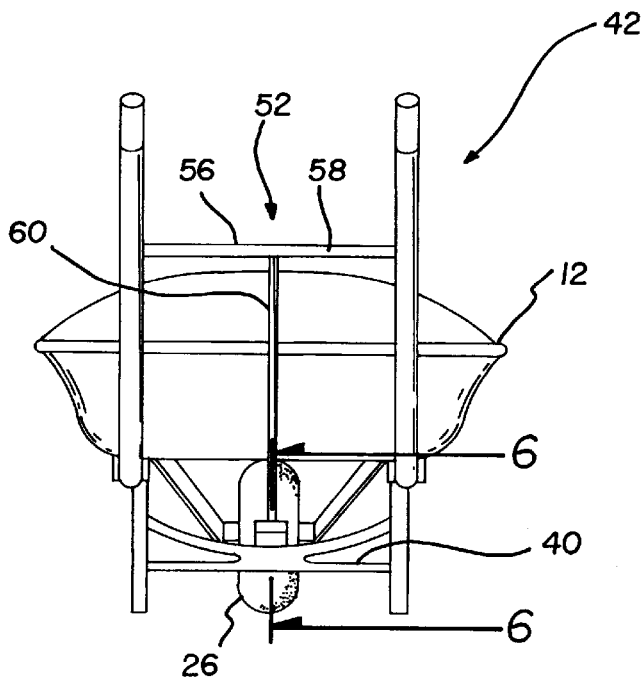
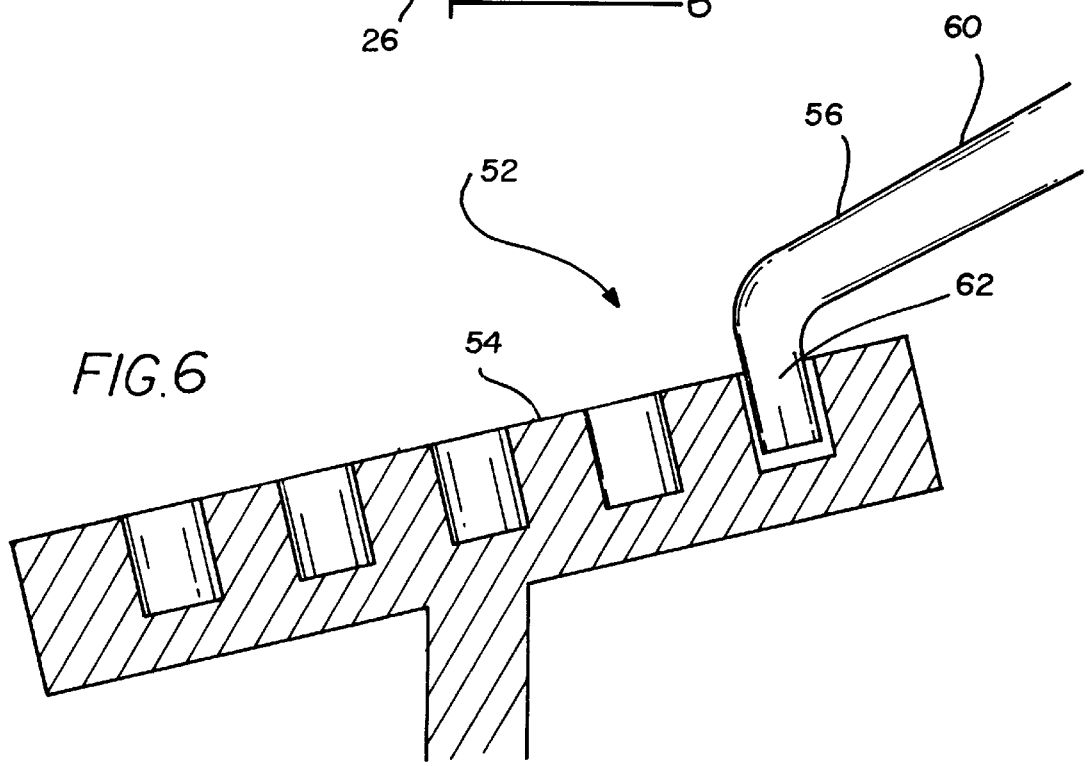

6,099,025

ADJUSTABLE WHEELBARROW SYSTEM

BACKGROUND OF THE INVENTION

1. Field of the Invention

The present invention relates to wheelbarrow assemblies and more particularly pertains to a new adjustable wheelbarrow system for adjusting an angle and a length of handles of a wheelbarrow for facilitated maneuvering by users of various sizes.

2. Description of the Prior Art

The use of wheelbarrow assemblies is known in the prior art. More specifically, wheelbarrow assemblies heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,026,079; U.S. Pat. No. 3,404,427; U.S. Pat. No. 4,767,128; U.S. Pat. No. 4,921,305; U.S. Pat. No. 4,471,996; and U.S. Pat. No. Des. 148,747.

In these respects, the adjustable wheelbarrow system according to the present invention substantially departs from the conventional concepts and designs of the prior art, and in so doing provides an apparatus primarily developed for the purpose of adjusting an angle and a length of handles of a wheelbarrow for facilitated maneuvering by users of various sizes.

SUMMARY OF THE INVENTION

In view of the foregoing disadvantages inherent in the known types of wheelbarrow assemblies now present in the prior art, the present invention provides a new adjustable wheelbarrow system construction wherein the same can be utilized for adjusting an angle and a length of handles of a wheelbarrow for facilitated maneuvering by users of various sizes.

The general purpose of the present invention, which will be described subsequently in greater detail, is to provide a new adjustable wheelbarrow system apparatus and method which has many of the advantages of the wheelbarrow assemblies mentioned heretofore and many novel features that result in a new adjustable wheelbarrow system which is not anticipated, rendered obvious, suggested, or even implied by any of the prior art wheelbarrow assemblies, either alone or in any combination thereof.

To attain this, the present invention generally comprises a basin having a bottom face including a linear rear edge, a pair of parallel linear side edges and an arcuate front edge. As shown in FIG. 1, the basin further includes a peripheral side wall coupled to a periphery of the bottom face and extends upwardly therefrom. A height of a rear extent of the peripheral side wall of the basin is less than that of a front extent of the peripheral side wall. Further included is a wheel support assembly having a pair of side bars each with a linear inboard extent coupled to a lower surface of the bottom face of the basin along one of the side edges thereof. Such side bars each further has a linear outboard extent coupled to the inboard extent and extending downwardly therefrom in a converging manner. Note FIG. 5. A wheel is rotatably mounted between centers of the outboard extents of the side bars. Further, a cross bar is connected between ends of the outboard extents of the side bars in front of the wheel. As best shown in FIGS. 1 & 4, a stand assembly is provided including a pair of feet each having a vertical member mounted adjacent to a rear end of the inboard extent of one of the side bars of the wheel support assembly. Associated therewith is a horizontal member having a first end integrally coupled to a bottom end of the vertical member. The feet each have a slanted support member with a bottom end integrally coupled to a second end of the horizontal member. As shown in the Figures, the slanted support member extends upwardly and forwardly for coupling with a front end of the inboard extent of one of the side bars of the wheel support assembly. Coupled between central extents of the vertical members of the feet of the stand assembly is a brace. Also included is a handle assembly including a pair of handle bars. Such handle bars each have an elongated linear inboard portion with a first end pivotally mounted to the rear end of the inboard extent of one of the side bars of the wheel support assembly. Each handle bar further includes a short linear outboard portion coupled to a second end of the inboard portion and extending therefrom at an obtuse angle to define a grip. As shown in FIGS. 4–6, the handle assembly further includes an adjustment mechanism having an adjustment plate fixedly coupled to the brace of the stand assembly at a central extent thereof along a longitudinal axis. Such adjustment plate is equipped with a plurality of linearly aligned cylindrical recesses formed therein along a length thereof. A locking arm is provided with a T-shaped configuration including a horizontal rod rotatably mounted between central extents of the inboard portions of the handle bars. The locking arm further has a vertical rod with a first end fixedly coupled to the horizontal rod and a second end having a coupling post extending downwardly from the horizontal rod in perpendicular relationship therewith. In use, the coupling post serves for being releasably inserted within one of the recesses of the adjusting plate.

As such, the handle bars of the handle assembly may be selectively angled with respect to the basin. With reference to FIGS. 1–3, the inboard portions of the handle bars of the handle assembly are shown to include an outboard component defined by a sleeve having a square cross-section along a length thereof. Further, each inboard portion of the handle bars are further defined by an inboard component including an insert having a square cross-section along a length thereof. The inboard component is further equipped with a plurality of linearly aligned apertures formed in an inner surface thereof. The sleeves of each handle bar includes a locking unit mounted on an inner face thereof. This locking unit is defined by a box with a pair of opposite faces including a pair of axially aligned bores formed therein. A pin is slidably mounted within the bores. Further, an elastomeric bulbous handle is coupled to a first end of the pin exterior of the box. Formed on the pin adjacent to and spaced from a second end of the pin is a flange that is positioned within the box. Lastly, a coil spring is positioned about the pin within the box for urging the second end of the pin within one of the apertures of the insert. The locking unit is thus adapted for fixing the inboard component and outboard component, thereby allowing a length of the handle bars to be selectively adjusted.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and specially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new adjustable wheelbarrow system apparatus and method which has many of the advantages of the wheelbarrow assemblies mentioned heretofore and many novel features that result in a new adjustable wheelbarrow system which is not anticipated, rendered obvious, suggested, or even implied by any of the prior art wheelbarrow assemblies, either alone or in any combination thereof.

It is another object of the present invention to provide a new adjustable wheelbarrow system which may be easily and efficiently manufactured and marketed.

It is a further object of the present invention to provide a new adjustable wheelbarrow system which is of a durable and reliable construction.

An even further object of the present invention is to provide a new adjustable wheelbarrow system which is susceptible of a low cost of manufacture with regard to both materials and labor, and which accordingly is then susceptible of low prices of sale to the consuming public, thereby making such adjustable wheelbarrow system economically available to the buying public.

Still yet another object of the present invention is to provide a new adjustable wheelbarrow system which provides in the apparatuses and methods of the prior art some of the advantages thereof, while simultaneously overcoming some of the disadvantages normally associated therewith.

Still another object of the present invention is to provide a new adjustable wheelbarrow system for adjusting an angle and a length of handles of a wheelbarrow for facilitated maneuvering by users of various sizes.

Even still another object of the present invention is to provide a new adjustable wheelbarrow system that includes a basin, a wheel support assembly including at least one bar mounted on the basin and having a wheel rotatably mounted thereon, and a stand assembly including at least one foot depending from the basin. Next provided is a handle assembly including a pair of handle bars each with a first end pivotally mounted with respect to the basin and an adjustment mechanism including an adjustment plate fixedly coupled to the stand assembly. The adjustment mechanism further includes a locking arm with a T-shaped configuration including a horizontal rod rotatably mounted between the handle bars and a vertical rod having a first end fixedly coupled to the horizontal rod and a second end being adjustably engageable with the locking plate. As such, the handle bars of the handle assembly may be selectively angled with respect to the basin. As an option, a length of the handle bars may also be adjusted.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new adjustable wheelbarrow system according to the present invention.

FIG. 2 is a detailed side view of the inboard and outboard components of one of the handle bars of the present invention.

FIG. 3 is a cross-sectional view of the locking unit of the present invention taken along line 3—3 shown in FIG. 2.

FIG. 4 is a side view of the present invention showing the pivoting nature of the handle bars of the handle assembly.

FIG. 5 is a rear view of the present invention.

FIG. 6 is a side cross-sectional view of the adjusting plate of the present invention.

DESCRIPTION OF THE PREFERRED EMBODIMENT

With reference now to the drawings, and in particular to FIG. 1 through 6 thereof, a new adjustable wheelbarrow system embodying the principles and concepts of the present invention and generally designated by the reference numeral 10 will be described.

The present invention, designated as numeral 10, includes a basin 12 having a bottom face 14 including a linear rear edge, a pair of parallel linear side edges and an arcuate front edge. As shown in FIG. 1, the basin further includes a peripheral side wall 16 coupled to a periphery of the bottom face and extends upwardly therefrom. A height of a rear extent of the peripheral side wall of the basin is less than that of a front extent of the peripheral side wall.

Further included is a wheel support assembly 18 having a pair of side bars 20 each with a linear inboard extent 22 coupled to a lower surface of the bottom face of the basin along one of the side edges thereof. Such side bars each further has a linear outboard extent 24 coupled to the inboard extent and extending downwardly therefrom in a converging manner. Note FIG. 5. A wheel 26 is rotatably mounted between centers of the outboard extents of the side bars. Further, a cross bar 28 is connected between ends of the outboard extents of the side bars in front of the wheel.

As best shown in FIGS. 1 & 4, a stand assembly 30 is provided including a pair of feet 32 each having a vertical member 34 mounted adjacent to a rear end of the inboard extent of one of the side bars of the wheel support assembly.

Associated therewith is a horizontal member 36 having a first end integrally coupled to a bottom end of the vertical member. The feet each have a slanted support member 38 with a bottom end integrally coupled to a second end of the horizontal member. As shown in the Figures, the slanted support member extends upwardly and forwardly for coupling with a front end of the inboard extent of one of the side bars of the wheel support assembly. Coupled between central extents of the vertical members of the feet of the stand assembly is a brace 40.

Also included is a handle assembly 42 including a pair of handle bars 44. Such handle bars each have an elongated linear inboard portion 46 with a first end pivotally mounted to the rear end of the inboard extent of one of the side bars of the wheel support assembly. Each handle bar further includes a short linear outboard portion 48 coupled to a second end of the inboard portion and extending therefrom at an obtuse angle to define a grip 50.

As shown in FIGS. 4–6, the handle assembly further includes an adjustment mechanism 52 having an adjustment plate 54 fixedly coupled to the brace of the stand assembly at a central extent thereof along a longitudinal axis. Such adjustment plate is equipped with a plurality of linearly aligned cylindrical recesses formed therein along a length thereof. Further, the adjustment plate is ideally positioned at an approximate 30 degree angle. The adjustment plate is thus positioned beneath the rear edge of the bottom face of the basin.

The adjustment mechanism further includes a locking arm 56 with a T-shaped configuration including a horizontal rod 58 rotatably mounted between central extents of the inboard portions of the handle bars. The locking arm further has a vertical rod 60 with a first end fixedly coupled to the horizontal rod and a second end having a coupling post 62 extending downwardly from the horizontal rod in perpendicular relationship therewith. In use, the coupling post serves for being releasably inserted within one of the recesses of the adjusting plate. As such, the handle bars of the handle assembly may be selectively angled about a horizontal axis with respect to the basin. It should be noted that the angle of the locking plate and the specific pivot points of the handle bars and locking arm preclude the disengagement of the locking arm and locking plate when the handle bars are lifted.

With reference to FIGS. 1–3, the inboard portions of the handle bars of the handle assembly are shown to include an outboard component 64 defined by a sleeve having a square cross-section along a length thereof. Further, each inboard portion of the handle bars are further defined by an inboard component 66 including an insert having a square cross-section along a length thereof. The inboard component is further equipped with a plurality of linearly aligned apertures 68 formed in an inner surface thereof.

The sleeves of each handle bar includes a locking unit 70 mounted on an inner face of an end thereof. This locking unit is defined by a box 72 with a pair of opposite faces including a pair of axially aligned bores 74 formed therein. A pin 76 is slidably mounted within the bores. Further, an elastomeric bulbous handle 78 is coupled to a first end of the pin exterior of the box. Formed on the pin adjacent to and spaced from a second end of the pin is a flange 80 that is positioned within the box. Lastly, a coil spring 82 is positioned about the pin within the box for urging the second end of the pin within one of the apertures of the insert. The locking unit is thus adapted for fixing the inboard component and outboard component, thereby allowing a length of the handle bars to be selectively adjusted. It should be noted that either of the adjustment features of the present invention may be used in combination on a single unit or used separately per the desires of the user. If used together, it should be noted that the locking arm would be pivotally mounted on the inboard components of the handle bars.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An adjustable wheelbarrow comprising, in combination:

a basin including a bottom face including a linear rear edge, a pair of parallel linear side edges and an arcuate front edge, the basin further including a peripheral side wall coupled to a periphery of the bottom face and extending upwardly therefrom wherein a height of a rear extent of the peripheral side wall of the basin is less than that of a front extent of the peripheral side wall;

a wheel support assembly including a pair of side bars each having a linear inboard extent coupled to a lower surface of the bottom face of the basin along one of the side edges thereof, a linear outboard extent coupled to the inboard extent and extending downwardly therefrom in a converging manner, a wheel rotatably mounted between centers of the outboard extents of the side bars, and a cross bar connected between ends of the outboard extents of the side bars in front of the wheel;

a stand assembly including a pair of feet each having a vertical member mounted adjacent to a rear end of the inboard extent of one of the side bars of the wheel support assembly, a horizontal member having a first end integrally coupled to a bottom end of the vertical member, and a slanted support member having a bottom end integrally coupled to a second end of the horizontal member and extending upwardly and forwardly therefrom for coupling with a front end of the inboard extent of one of the side bars of the wheel support assembly, wherein a brace is coupled between central extents of the vertical members of the feet of the stand assembly; and a handle assembly including a pair of handle bars each including an elongated linear inboard portion with a first end pivotally mounted to the rear end of the inboard extent of one of the side bars of the wheel support assembly and a short linear outboard portion coupled to a second end of the inboard portion and extending therefrom at an obtuse angle, the handle assembly further including an adjustment mechanism including an adjustment plate fixedly coupled to the brace of the stand assembly at a central extent thereof with a plurality of linearly aligned cylindrical recesses formed therein along a length thereof, a locking arm with a T-shaped configuration including a horizontal rod rotatably mounted between central extents of the inboard portions of the handle bars and a vertical rod having a first end fixedly coupled to the horizontal rod and a second end having a coupling post extending downwardly from the horizontal rod in perpendicular relationship therewith for being releasably inserted within one of the recesses of the adjustment plate such that the handle bars of the handle assembly may be selectively angled with respect to the basin;

said inboard portions of the handle bars of the handle assembly including an outboard component defined by a sleeve having a square cross-section along a length thereof and an inboard component including an insert having a square cross-section along a length thereof and a plurality of linearly aligned apertures formed in an inner surface thereof, the sleeves each including a locking unit mounted on an inner face thereof defined by a box with a pair of opposite faces including a pair of axially aligned bores formed therein, a pin slidably mounted within the bores, an elastomeric bulbous handle coupled to a first end of the pin exterior of the box, a flange formed on the pin adjacent to and spaced from a second end of the pin within the box, and a coil spring positioned about the pin within the box for urging the second end of the pin within one of the apertures of the insert for fixing the inboard component and outboard component, thereby allowing a length of the handle bars to be selectively adjusted.

2. An adjustable wheelbarrow comprising:

a basin;

a wheel support assembly including at least one bar mounted on the basin and having a wheel rotatably mounted thereon;

a stand assembly including at least one foot depending from the basin; and a handle assembly including a pair of handle bars each with a first end pivotally mounted with respect to the basin and an adjustment mechanism including an adjustment plate fixedly coupled to the wheelbarrow and a locking arm with a T-shaped configuration including a horizontal rod rotatably mounted between the handle bars and a vertical rod having a first end fixedly coupled to the horizontal rod and a second end being adjustably engageable with the adjustment plate such that the handle bars of the handle assembly may be selectively angled with respect to the basin.

3. An adjustable wheelbarrow as set forth in claim 2 wherein the handle bars of the handle assembly each include a first component defined by a sleeve having a square cross-section along a length thereof and a second component including an insert having a square cross-section along a length thereof and a plurality of linearly aligned apertures formed in an inner surface thereof, the sleeves each including a locking unit for releasably engaging one of the apertures for fixing the inboard component and outboard component, thereby allowing a length of the handle bars to be selectively adjusted.

4. An adjustable wheelbarrow as set forth in claim 3 wherein each locking unit includes a box with a pair of opposite faces including a pair of axially aligned bores formed therein, a pin slidably mounted within the bores, an elastomeric bulbous handle coupled to a first end of the pin exterior of the box, a flange formed on the pin adjacent to and spaced from a second end of the pin within the box, and a coil spring positioned about the pin within the box for urging the second end of the pin within one of the apertures of the insert.

5. An adjustable wheelbarrow as set forth in claim 2 wherein the adjustment plate has a plurality of linearly aligned apertures formed therein and the vertical rod has a coupling post removably positioned within one of the apertures of the adjustment plate.

6. An adjustable wheelbarrow comprising:

a basin;

a wheel support assembly including at least one bar mounted on the basin and having a wheel rotatably mounted thereon;

a stand assembly including at least one foot depending from the basin; and a handle assembly including a pair of handle bars each with a first end extending from the basin for handling purposes;

wherein the handle bars of the handle assembly include a first component defined by a sleeve having a square cross-section along a length thereof and a second component including an insert having a square cross-section along a length thereof and a plurality of linearly aligned apertures formed in an inner surface thereof, the sleeves each including a locking unit for releasably engaging, one of the apertures for fixing, the inboard component and outboard component, thereby allowing a length of the handle bars to be selectively adjusted, and wherein each locking unit includes a box with a pair of opposite faces including a pair of axially aligned bores formed therein, a pin slidably mounted within the bores, an elastomeric bulbous handle coupled to a first end of the pin exterior of the box, a flange formed on the pin adjacent to and spaced from a second end of the pin within the box, and a coil spring positioned about the pin within the box for urging the second end of the pin within one of the apertures of the bores of apertures of the insert.

* * * * *